(12) United States Patent
Fukushima et al.

(10) Patent No.: US 9,969,917 B2
(45) Date of Patent: May 15, 2018

(54) METHOD FOR PRODUCING WORKING FLUID

(71) Applicant: Asahi Glass Company, Limited, Chiyoda-ku (JP)

(72) Inventors: Masato Fukushima, Chiyoda-ku (JP); Satoshi Kawaguchi, Chiyoda-ku (JP); Mai Tasaka, Chiyoda-ku (JP); Katsuya Ueno, Chiyoda-ku (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 107 days.

(21) Appl. No.: 15/220,528

(22) Filed: Jul. 27, 2016

(65) Prior Publication Data

US 2016/0333242 A1    Nov. 17, 2016

Related U.S. Application Data

(63) Continuation of application No. PCT/JP2015/052536, filed on Jan. 29, 2015.

(30) Foreign Application Priority Data

Jan. 31, 2014  (JP) .................................. 2014-017967
Mar. 18, 2014  (JP) .................................. 2014-055603

(51) Int. Cl.
*C09K 5/04*    (2006.01)

(52) U.S. Cl.
CPC ........ *C09K 5/045* (2013.01); *C09K 2205/122* (2013.01); *C09K 2205/126* (2013.01); *C09K 2205/22* (2013.01)

(58) Field of Classification Search
CPC .... C09K 5/044; C09K 5/045; C09K 2205/22; C09K 2205/122; C09K 2205/126
See application file for complete search history.

(56) References Cited

U.S. PATENT DOCUMENTS 5,696,306 A * 12/1997 Ide ..................... C07C 17/42
                                                570/109
7,017,898 B2    3/2006 Varzino et al.
(Continued)

FOREIGN PATENT DOCUMENTS

| EP | 3 020 780 A1 | 5/2016 |
|---|---|---|
| WO | WO 2012/157764 A1 | 11/2012 |
| WO | WO 2014/178353 A1 | 11/2014 |

OTHER PUBLICATIONS

International Search Report dated Apr. 21, 2015 in PCT/JP2015/052536, filed on Jan. 29, 2015.

(Continued)

*Primary Examiner* — John R Hardee
(74) *Attorney, Agent, or Firm* — Oblon, McClelland, Maier & Neustadt, L.L.P.

(57) ABSTRACT

To provide a method for stably and efficiently producing a working fluid which has less influence over global warming and which can be stably used by a usual operation even though it contains trifluoroethylene (HFO-1123) excellent in the cycle performance.
A method for producing a working fluid containing HFO-1123 in a proportion of at most 70 mol %, which comprises mixing a first component containing HFO-1123 in a proportion of higher than 70 mol % stored in a first container, and a second component having no self-decomposition property stored in a second container, by supplying the first component to the second container, by supplying the second component to the first container, or by supplying both the first component and the second component to a separate third container, respectively under the predetermined conditions.

12 Claims, 5 Drawing Sheets

DD: Low temperature region
EE: Low pressure region

(56) References Cited

U.S. PATENT DOCUMENTS

| | | | |
|---|---|---|---|
| 2014/0070132 A1* | 3/2014 | Fukushima | F25D 9/002 252/67 |
| 2015/0017064 A1* | 1/2015 | Antenucci | C07C 17/354 422/41 |

OTHER PUBLICATIONS

Ya. A Lisochkin et al. "Explosive-Hazard Estimates for Several Fluorine-Containing Monomers and Their Mixtures, Based on the Minimum Ignition Pressure with a Fixed Igniter Energy", Combustion, Explosion, and Shock Waves, vol. 42, No. 2, 2006, 4 pages.

* cited by examiner

AA: With self-decomposition property
BB: No self-decomposition property

CC: Range suitable for storage

DD: Low temperature region
EE: Low pressure region

FF: Crude HFO-1123

(4a)

(4b)

(4c)

(5a)

(5b)

(6a)

(6b)

(7a)

(7b)

METHOD FOR PRODUCING WORKING FLUID

TECHNICAL FIELD

The present invention relates to a method for producing a working fluid, and relates to a method for stably producing a working fluid which has less influence over global warming, which has high capacity and which is easily handled.

BACKGROUND ART

In this specification, abbreviated names of halogenated hydrocarbon compounds are described in brackets after the compound names, and in this specification, the abbreviated names are employed instead of the compound names as the case requires.

Heretofore, as a working fluid for heat cycle such as a refrigerant for a refrigerator, a refrigerant for an air-conditioning apparatus, a working fluid for power generation system (such as exhaust heat recovery power generation), a working fluid for a latent heat transport apparatus (such as a heat pipe) or a secondary cooling fluid, a chlorofluorocarbon (CFC) such as chlorotrifluoromethane or dichlorodifluoromethane or a hydrochlorofluorocarbon (HCFC) such as chlorodifluoromethane has been used. However, influences of CFCs and HCFCs over the ozone layer in the stratosphere have been pointed out, and their use is regulated at present.

Under the above conditions, as a working fluid for heat cycle, a hydrofluorocarbon (HFC) which has less influence over the ozone layer, such as difluoromethane (HFC-32), tetrafluoroethane or pentafluoroethane (HFC-125) has been used, instead of CFCs and HCFCs. For example, R410A (a pseudoazeotropic mixture refrigerant of HFC-32 and HFC-125 in a mass ratio of 1:1) is a refrigerant which has been widely used. However, it is pointed out that HFCs may cause global warming.

R410A has been widely used for a common air-conditioning apparatus such as a so-called package air-conditioner or room air-conditioner, due to its high refrigerating capacity. However, it has a global warming potential (GWP) of so high as 2,088, and accordingly development of a working fluid with low GWP has been desired. Further, development of a working fluid has been desired on the condition that R410A is simply replaced and existing apparatus will be used as they are.

In recent years, a hydrofluoroolefin (HFO) i.e. a HFC having a carbon-carbon double bond is expected, which is a working fluid having less influence over the ozone layer and having less influence over global warming, since the carbon-carbon double bond is likely to be decomposed by OH radicals in the air. In this specification, a saturated HFC will be referred to as a HFC and distinguished from a HFO unless otherwise specified. Further, a HFC may be referred to as a saturated hydrofluorocarbon in some cases.

As a working fluid employing such a HFO, for example, Patent Document 1 discloses a technique relating to a working fluid using trifluoroethylene (HFO-1123) which has the above properties and with which excellent cycle performance will be obtained. Patent Document 1 also discloses an attempt to obtain a working fluid comprising HFO-1123 and various HFCs in combination for the purpose of increasing the flame retardancy, cycle performance, etc. of the working fluid.

HFO-1123 is known to undergo so-called self-decomposition at high temperature or with an ignition source under high pressure. Therefore, an attempt to suppress self-decomposition reaction by mixing HFO-1123 with another component such as vinylidene fluoride to form a mixture having a lowered content of HFO-1123 has been reported (Non-Patent Document 1).

However, Non-Patent Document 1 failed to disclose a composition which is excellent in stability without self-decomposition while maintaining cycle performance of HFO-1123, under the temperature and pressure conditions under which the composition is used as the working fluid, and a method for stably producing such a composition.

PRIOR ART DOCUMENTS

Patent Document

Patent Document 1: WO2012/157764

Non-Patent Document

Non-Patent Document 1: Combustion, Explosion, and Shock Waves, Vol. 42, No 2, pp. 140-143, 2006

DISCLOSURE OF INVENTION

Technical Problem

The present inventors have confirmed that with respect to the self-decomposition property of HFO-1123, a composition comprising HFO-1123 in a content of at most 70 mol % based on the entire amount of the composition, has no self-decomposition property under the temperature and pressure conditions under which the composition is used as a working fluid.

Under these circumstances, it is an object of the present invention to provide a method for stably and efficiently producing a working fluid which has less influence over global warming and which is excellent in the stability by a useful operation even though it contains HFO-1123 excellent in the cycle performance.

Solution to Problem

The present invention provides a method for producing a working fluid of the following [1] to [12].

[1] A method for producing a working fluid containing trifluoroethylene in a proportion of at most 70 mol % based on the entire amount, which comprises mixing a first component containing trifluoroethylene in a proportion of higher than 70 mol % stored in a first container, and a second component having no self-decomposition property containing at least one member selected from a saturated hydrofluorocarbon, an unsaturated hydrofluorocarbon, an unsaturated hydrochlorofluorocarbon and an unsaturated chlorofluorocarbon in a proportion of at least 30 mol %, stored in a second container, by the following step (A), (B) or (C):

(A) the first component is supplied to the second container under the following condition (1) or (2):

(1) the temperature (t1) of the first component at the time of the supply is t1<0.5° C., and at least during the period from the start of the supply to the completion of mixing, the relation between the gauge pressure (P2) in the second container and the gauge pressure (p1) of the first component at the time of the supply is kept to be p1>P2, and the temperature (T2) in the second container is kept to be in a state of T2<0.5° C.;

(2) the first component at the time of the supply is in a gaseous state with its temperature (t1) of 0.5° C.≤t1≤180° C. and its gauge pressure (p1) of p1[MPa]<1.05−0.0025t1, and at least during the period from the start of the supply to the completion of mixing, the relation between the gauge pressure (P2) in the second container and the gauge pressure (p1) of the first component is kept to be p1>P2, and the temperature (T2) in the second container is kept to be in a state of T2≤180° C. and T2<(1.05−p1)/0.0025;

(B) the second component is supplied to the first container under the following conditions (3) and (4):

(3) at least during the period from the start of the supply to the completion of mixing, the temperature (T1) and the gauge pressure (P1) in the first container are kept to be in a state of T1<0.5° C. or in a state of 0.5° C.≤T1≤180° C. and P1[MPa]<1.05−0.0025T1;

(4) the gauge pressure (p2) of the second component is p2>P1 at least at the time of the supply;

(C) to a separate third container, while at least during the period from the start of the following supply to the completion of mixing, the temperature (T3) and the gauge pressure (P3) in the third container are kept to be in a state of T3<0.5° C. or in a state of 0.5° C.≤T3≤180° C. and P3[MPa]<1.05−0.0025T3, the first component is supplied under the following condition (5) or (6), and the second component is supplied while at least at the time of the supply, its gauge pressure (p2) is kept to be p2>P3:

(5) the temperature (t1) of the first component at the time of the supply is t1<0.5° C., and at least during the period from the start of the supply to the completion of mixing, the relation between the gauge pressure (P3) in the third container and the gauge pressure (p1) of the first component at the time of the supply is kept to be p1>P3, and the temperature (T3) in the third container is kept to be in a state of T3<0.5° C.;

(6) the first component at the time of the supply is in a gaseous state with its temperature (t1) of 0.5° C.≤T1≤180° C. and its gauge pressure (p1) of p1[MPa]<1.05−0.0025t1, and at least during the period from the start of the supply to the completion of mixing, the relation between the gauge pressure (P3) in the third container and the gauge pressure (p1) of the first component is kept to be p1>P3, and the temperature (T3) in the third container is kept to be in a state of T3≤180° C. and T3<(1.05−p1)/0.0025.

[2] The method for producing a working fluid according to [1], wherein in the step (A), both the temperature in the first container and the temperature in the second container are kept to be less than 0.5° C., and the first component in a liquid state with t1<0.5° C. is supplied to the second container.

[3] The method for producing a working fluid according to [1], wherein in the step (B), both the temperature in the first container and the temperature in the second container are kept to be less than 0.5° C., and the second component in a liquid state with t2<0.5° C. is supplied to the first container.

[4] The method for producing a working fluid according to [1], wherein in the step (C), all of the temperature in the first container, the temperature in the second container and the temperature in the third container are kept to be less than 0.5° C., and the first component in a liquid state with t1<0.5° C. and the second component in a liquid state with t2<0.5° C. are respectively supplied to the third container.

[5] The method for producing a working fluid according to any one of [1] to [4], wherein the second component is 2,3,3,3-tetrafluoropropene and/or difluoromethane.

[6] The method for producing a working fluid according to any one of [1] to [5], wherein the working fluid obtained by mixing the first component and the second component is a working fluid containing trifluoroethylene and 2,3,3,3-tetrafluoropropene, the proportion of the total amount of trifluoroethylene and 2,3,3,3-tetrafluoropropene based on the entire amount of the working fluid is from 70 to 100 mass %, and based on the total amount of trifluoroethylene and 2,3,3,3-tetrafluoropropene, the proportion of trifluoroethylene is at least 35 mass % and at most 70 mass %

[7] The method for producing a working fluid according to any one of [1] to [5], wherein the working fluid obtained by mixing the first component and the second component is a working fluid containing trifluoroethylene and difluoromethane, the proportion of the total amount of trifluoroethylene and difluoromethane based on the entire amount of the working fluid is from 70 to 100 mass %, and based on the total amount of trifluoroethylene and difluoromethane, the proportion of trifluoroethylene is at least 35 mass % and at most 70 mass %.

[8] The method for producing a working fluid according to any one of [1] to [5], wherein the working fluid obtained by mixing the first component and the second component is a working fluid containing trifluoroethylene, 2,3,3,3-tetrafluoropropene and difluoromethane, the proportion of the total amount of trifluoroethylene, 2,3,3,3-tetrafluoropropene and difluoromethane based on the entire amount of the working fluid is from 70 to 100 mass %, and based on the total amount of trifluoroethylene, 2,3,3,3-tetrafluoropropene and difluoromethane, the proportion of trifluoroethylene is at least 10 mass % and at most 70 mass %, the proportion of 2,3,3,3-tetrafluoropropene is at most 50 mass %, and the proportion of difluoromethane is at most 75 mass %.

[9] The method for producing a working fluid according to any one of [6] to [8], wherein the first component is trifluoroethylene.

[10] The method for producing a working fluid according to [8], wherein the second component is a mixture of 2,3,3,3-tetrafluoropropene and difluoromethane.

[11] The method for producing a working fluid according to any one of [1] to [4], wherein the second component is trans-1,3,3,3-tetrafluoropropene.

[12] The method for producing a working fluid according to any one of [1] to [4], wherein the second component is a mixture of trans-1,3,3,3-tetrafluoropropene and difluoromethane.

Advantageous Effects of Invention

According to the production method of the present invention, a working fluid which has less influence over global warming and which is excellent in the cycle performance can be produced stably and efficiently.

DESCRIPTION OF EMBODIMENTS

Figure 1:
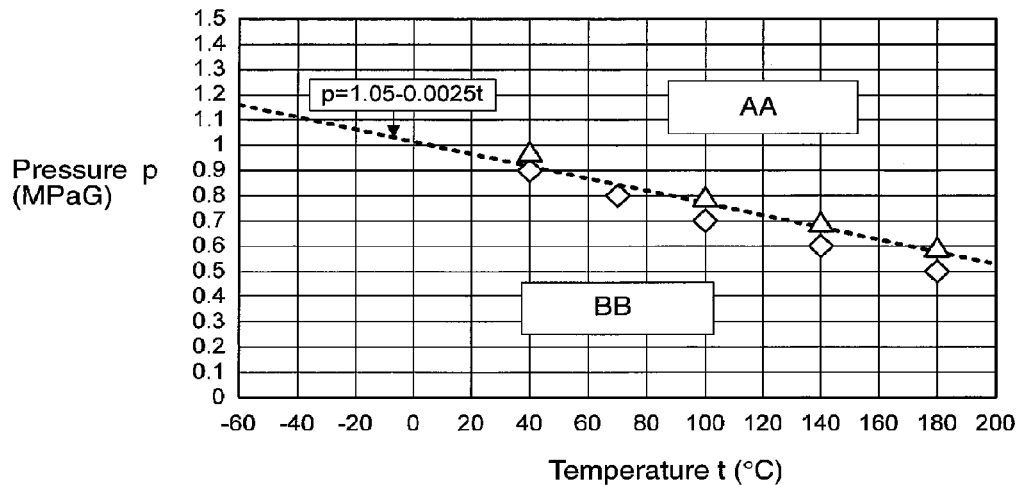
FIG. 1 is a graph illustrating the condition of the temperature (t) and the pressure (gauge pressure) (p) under which HFO-1123 undergoes self-decomposition.

Now, the present invention will be described in detail.
(Working Fluid)

The working fluid to be produced by the production method of the present invention is a working fluid containing HFO-1123 in a proportion of at most 70 mol % based on the entire amount of the working fluid.

The present inventors have confirmed that a composition containing HFO-1123 in a content of at most 70 mol % based on the entire amount of the composition, has no self-decomposition property under the temperature and pressure conditions under which the composition is used as a working fluid.

In this specification, the self-decomposition property of a composition containing HFO-1123 is evaluated by the following method, and a composition which undergoes self-decomposition reaction is rated as having self-decomposition property, and a composition which does not undergo self-decomposition reaction is rated as having no self-decomposition property.
<Evaluation of Self-Decomposition Property of HFO-1123-Containing Composition>

The self-decomposition property was evaluated in equipment in accordance with method A recommended as equipment for measurement of the combustion range of a gas mixture containing halogen, by individual notifications in High Pressure Gas Safety Act.

Specifically, each of mixed fluids of HFO-1123 and 2,3,3,3-tetrafluoropropene (HFO-1234yf), HFO-1123 and HFC-32, or HFO-1123, HFO-1234yf and HFC-32, in various proportions, is enclosed in a spherical pressure resistant reactor having an internal capacity of 650 $cm^3$ and having a predetermined temperature controlled from the outside, to a predetermined pressure, and then a platinum wire disposed in the interior was fused to apply an energy of about 30 J.

Further, each of mixed fluids of HFO-1123, trans-1,3,3,3-tetrafluoropropene (HFO-1234ze(E)) and HFC-32, or HFO-1123 and HFO-1234ze(E), in various proportions, was enclosed in a spherical pressure resistant reactor having an internal capacity of 700 $cm^3$ and having a predetermined temperature (from 200 to 300° C.) controlled from the outside, to a predetermined pressure (from 4.0 to 10.0 MPa by the gauge pressure), and then a platinum wire disposed in the interior was fused to apply an energy of about 30 J.

Whether the self-decomposition reaction occurred or not was confirmed by measuring the temperature and pressure changes in the pressure resistant reactor after the application. In a case where a pressure increase and a temperature increase were confirmed, a working fluid was rated as having undergone self-decomposition reaction. In the case of a mixed fluid of HFO-1123, HFO-1234ze(E) and HFC-32 and a mixed fluid of HFO-1123 and HFO-1234ze(E), a working fluid with a pressure difference between before and after ignition of at least 1 MPaG and a temperature difference of at least 10° C. was rated as having undergone disproportionation reaction.

The results are shown in Table 1 with respect to the mixed fluid of HFO-1123 and HFO-1234yf, in Table 2 with respect to the mixed fluid of HFO-1123 and HFC-32, in Table 3 with respect to the mixed fluid of HFO-1123, HFO-1234yf and HFC-32, in Table 4 with respect to the mixed fluid of HFO-1123, HFO-1234ze(E) and HFC-32, and in Table 5 with respect to the mixed fluid of HFO-1123 and HFO-1234ze(E). The pressure in Tables 1 to 5 is the gauge pressure.

TABLE 1

| HFO-1123/HFO-1234yf | | Pressure [MPaG] | | Temperature [° C.] | | Self-decomposition reaction |
|---|---|---|---|---|---|---|
| [mass %/mass %] | [mol %/mol %] | Before ignition | After ignition | Before ignition | After ignition | |
| 52/48 | 60/40 | 0.98 | 0.98 | 250 | 250.2 | Nil |
| 63/37 | 70/30 | 0.98 | 0.98 | 250 | 250.2 | Nil |
| 74/26 | 80/20 | 0.98 | 4.00 | 250 | 291.6 | Occurred |
| 87/13 | 90/10 | 0.98 | 4.80 | 250 | 291.1 | Occurred |

TABLE 2

| HFO-1123/HFC-32 | | Pressure [MPaG] | | Temperature [° C.] | | Self-decomposition reaction |
|---|---|---|---|---|---|---|
| [mass %/mass %] | [mol %/mol %] | Before ignition | After ignition | Before ignition | After ignition | |
| 70/30 | 60/40 | 0.98 | 0.98 | 250 | 250.5 | Nil |
| 80/20 | 72/28 | 0.98 | 0.98 | 250 | 250.4 | Nil |
| 85/15 | 78/22 | 0.98 | 4.60 | 250 | 290.0 | Occurred |

TABLE 3

| HFO-1123/HFO-1234yf/HFC-32 | | Pressure [MPaG] | | Temperature [° C.] | | Self-decomposition reaction |
|---|---|---|---|---|---|---|
| [mass %/mass %/mass %] | [mol %/mol %/mol %] | Before ignition | After ignition | Before ignition | After ignition | |
| 70/10/20 | 64/7/29 | 0.98 | 0.98 | 250 | 250.5 | Nil |
| 70/20/10 | 70/14/16 | 0.98 | 0.98 | 250 | 250.5 | Nil |
| 80/10/10 | 78/7/15 | 0.98 | 4.00 | 250 | 289.5 | Occurred |

TABLE 4

| HFO-1123/HFO-1234ze(E)/HFC-32 | | Self-decomposition reaction |
|---|---|---|
| [mass %/mass %/mass %] | [mol %/mol %/mol %] | |
| 50/40/10 | 53/30/17 | Nil |
| 50/30/20 | 48/21/31 | Nil |
| 40/40/20 | 40/29/31 | Nil |
| 40/30/30 | 37/20/43 | Nil |
| 30/40/30 | 28/27/45 | Nil |
| 40/20/40 | 34/12/54 | Nil |
| 30/30/40 | 26/19/55 | Nil |
| 20/40/40 | 18/26/56 | Nil |

TABLE 5

| HFO-1123/HFO-1234ze(E) | | Self-decomposition reaction |
|---|---|---|
| [mass %/mass %] | [mol %/mol %] | |
| 90/10 | 93/7 | Occurred |
| 80/20 | 85/15 | Occurred |
| 70/30 | 76/24 | Occurred |
| 60/40 | 68/32 | Nil |
| 50/50 | 58/42 | Nil |
| 40/60 | 48/52 | Nil |
| 30/70 | 37/63 | Nil |
| 20/80 | 26/74 | Nil |
| 10/90 | 13/87 | Nil |
| 8/92 | 11/89 | Nil |
| 6/94 | 8/92 | Nil |
| 4/96 | 5/95 | Nil |
| 2/98 | 3/97 | Nil |

It is found from Tables 1 to 5 that a composition having a HFO-1123 content of at most 70 mol % based on the entire amount of the composition is a highly stable composition. Here, a compound to be combined with HFO-1123 to form a working fluid is a compound at least which has no self-decomposition property and which does not destroy the ozone layer. Such a compound may, for example, be at least one member (which has no self-decomposition property) selected from a saturated hydrofluorocarbon, an unsaturated hydrofluorocarbon (hereinafter sometimes referred to as "HFC"), an unsaturated hydrochlorofluorocarbon (hereinafter sometimes referred to as "HFO") and an unsaturated chlorofluorocarbon (hereinafter sometimes referred to as "CFO").

The HFC may, for example, be HFC-32, difluoroethane, trifluoroethane, tetrafluoroethane, HFC-125, pentafluoropropane, hexafluoropropane, heptafluoropropane, pentafluorobutane or heptafluorocyclopentane.

Among them, the HFC is, in view of less influence over the ozone layer and excellent refrigerating cycle properties, preferably HFC-32, 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a) or HFC-125, more preferably HFC-32, HFC-134a or HFC-125, most preferably HFC-32.

The HFC may be used alone or in combination of two or more.

As the HFO, the HFO other than HFO-1123 may, for example, be HFO-1234yf, 1,2-difluoroethylene (HFO-1132), 2-fluoropropene (HFO-1261yf), 1,1,2-trifluoropropene (HFO-1243yc), trans-1,2,3,3,3-pentafluoropropene (HFO-1225ye(E)), cis-1,2,3,3,3-pentafluoropropene (HFO-1225ye(Z)), HOF-1234ze(E), cis-1,3,3,3-tetrafluoropropene (HFO-1234ze(Z)) or 3,3,3-trifluoropropene (HFO-1243zf).

Among them, preferred is HFO-1234yf, HFO-1234ze(E) or HFO-1234ze(Z), more preferred is HFO-1234yf or HFO-1234ze(E).

The HFO other than HFO-1123 may be used alone or in combination of two or more.

The CFO may, for example, be chlorofluoropropene or chlorofluoroethylene. With a view to suppressing the flammability of working fluid without significantly decreasing the cycle performance of the working fluid, the CFO is preferably 1,1-dichloro-2,3,3,3-tetrafluoropropene (CFO-1214ya), 1,3-dichloro-1,2,3,3-tetrafluoropropene (CFO-1214yb) or 1,2-dichloro-1,2-difluoroethylene (CFO-1112).

The CFO may be used alone or in combination of two or more.

The working fluid to be produced by the production method of the present invention contains a component other than HFO-1123 in a proportion of at least 30 mol %. The working fluid is preferably a working fluid containing HFO-1123 and another component in combination within the above composition range, which has practically sufficient cycle performance as an alternative to conventional R410A and has a low global warming potential (GWP).

Here, GWP is a value (100 years) measured in accordance with Intergovernmental Panel on Climate Change (IPCC), Fourth assessment report (2007), and GWP of HFO-1123 is 0.3.

The compound to be combined with HFO-1123 is preferably such a compound that when combined within the above composition range to obtain a working fluid, GWP of the working fluid is at most 2088 of GWP of R410A, more preferably at most 500. In this specification, GWP of a mixture is represented by a weighted average by the mass of the respective components in the mixture.

Further, in a case where the working fluid is a mixture, if the mixture is a non-azeotropic mixture, problems may arise such that when the mixture is put into a refrigerator or an air-conditioning apparatus from a pressure container, it undergoes a composition change, if a refrigerant leaks out from a refrigerator or an air-conditioning apparatus, the refrigerant composition in the refrigerator or the air-conditioning apparatus is very likely to change, and a recovery to an initial refrigerant composition is hardly possible. Accordingly, the working fluid to be produced by the recent invention is preferably a pseudoazeotropic mixture fluid, such as R410A, with a view to avoiding the above problems.

As an index to the above property of a mixture as a working fluid, commonly "temperature glide" described hereinafter is employed. The temperature glide is defined as properties such that the initiation temperature and the completion temperature of evaporation in an evaporator or of condensation in a condenser, for example, as the heat exchanger, differ from each other. The temperature glide of an azeotropic mixture fluid is 0, and the temperature glide of a pseudoazeotropic mixture fluid such as R410A is extremely close to 0.

If the temperature glide is large, for example, the inlet temperature of an evaporator tends to be low, and frosting is likely to occur. Further, in a heat cycle system, the heat exchange efficiency is to be improved by making the working fluid and the heat source fluid such as water or the air flowing in heat exchangers flow in counter-current flow. Since the temperature different of the heat source fluid is small in a stable operation state, it is difficult to obtain a heat cycle system with a good energy efficiency with a non-azeotropic mixture fluid with a large temperature glide. Accordingly, the working fluid to be produced by the present invention is, if it is a non-azeotropic mixture fluid, preferably a non-azeotropic mixture fluid with an appropriately small temperature glide.

The working fluid to be produced by the present invention is preferably a working fluid which overcomes the problem of the self-decomposition by use of HFO-1123 by itself, and which further satisfies the above cycle performance, GWP and temperature glide in a balanced manner, and to obtain such a working fluid, the compound to be combined with HFO-1123 is preferably HFO-1234yf and/or HFC-32.

The lower limit of the content of HFO-1123 in the working fluid to be produced by the present invention is preferably 30 mol %, more preferably 40 mol %.

The composition of a combination of HFO-1123 and HFO-1234yf and/or HFC-32 may be specifically any one of the following compositions having a content of HFO-1123 based on the entire amount of the working fluid of at most 70 mol %.

(i) A working fluid containing HFO-1123 and HFO-1234yf, wherein the proportion of the total amount of HFO-1123 and HFO-1234yf based on the entire amount of the working fluid is from 70 to 100 mass %, and based on the total amount of HFO-1123 and HFO-1234yf, the proportion of HFO-1123 is at least 35 mass % and at most 70 mass %.

(ii) A working fluid containing HFO-1123 and HFC-32, wherein the proportion of the total amount of HFO-1123 and HFC-32 based on the entire amount of the working fluid is from 70 to 100 mass %, and based on the total amount of HFO-1123 and HFC-32, the proportion of HFO-1123 is at least 35 mass % and at most 70 mass %, preferably from 40 to 60 mass %.

(iii) A working fluid containing HFO-1123, HFO-1234yf and HFC-32, wherein the proportion of the total amount of HFO-1123, HFO-1234yf and HFC-32 based on the entire amount of the working fluid is from 70 to 100 mass %, and based on the total amount of HFO-1123, HFO-1234yf and HFC-32, the proportion of HFO-1123 is at least 10 mass % and at most 70 mass %, the proportion of HFO-1234yf is at most 50 mass %, and the proportion of HFC-32 is at most 75 mass %.

(Production Method of the Present Invention)

The production method of the present invention is characterized by mixing a first component containing trifluoroethylene in a proportion of higher than 70 mol % stored in a first container, and a second component having no self-decomposition property containing at least one member selected from a saturated hydrofluorocarbon, an unsaturated hydrofluorocarbon, an unsaturated hydrochlorofluorocarbon and an unsaturated chlorofluorocarbon in a proportion of at least 30 mol %, stored in a second container, by the following step (A), (B) or (C) to obtain a working fluid containing trifluoroethylene in a proportion of at most 70 mol % based on the entire amount.

(A) The first component is supplied to the second container under a predetermined condition, specifically the after-mentioned condition (1) or (2).

(B) The second component is supplied to the first container under a predetermined condition, specifically under the after-mentioned conditions (3) and (4).

(C) To a separate third container, while the interior of the third container is kept in the after-mentioned predetermined state, the first component is supplied under a predetermined condition, specifically under the after-mentioned condition (5) or (6), and the second component is supplied under the after-mentioned predetermined condition.

The production method of the present invention has any one of the above steps (A), (B) and (C) to mix the first component and the second component. Now, the respective components and the respective steps will be described in detail with reference to FIGS. 1 to 7.

(First Component)

The first component contains HFO-1123 in a proportion of higher than 70 mol %. If the first component has a content of HFO-1123 of higher than 70 mol %, it is likely to undergo self-decomposition. In the production method of the present invention, it is necessary to mix the first component with the second component under a condition under which the first component does not undergo self-decomposition. The first component is most likely to undergo self-decomposition when it has a content of HFO-1123 of 100 mol %. Accordingly, at the time of condition setting to secure the stability in the steps (A) to (C), when the condition is set assuming that the first component consists solely of HFO-1123, the stability will be secured even in a case where the content of HFO-1123 in the first component is not 100 ml %.

In a case where the first component consists solely of 100 mol % of HFO-1123, its self-decomposition property is controlled by the relation between the temperature (t) and the pressure (p). FIG. 1 is a graph illustrating the condition of the temperature (t) and the pressure (gauge pressure) (p) under which HFO-1123 undergoes self-decom position, and a dotted straight line illustrates a boundary of the self-decom position property. The formula represented by the straight line is $p[MPaG]=1.05-0.0025t$. In FIG. 1, the region above the straight line is a state with self-decomposition property, and the region below the straight line is a region with no self-decomposition property. That is, in a state where p is lower than $1.05-0.0025t$, HFO-1123 has no self-decomposition property. Hereinafter, this straight line will sometimes be referred to as "self-decomposition boundary".

In FIG. 1, points represented by rhomboids are points rated as having no self-decomposition property, and points represented by triangles are points rated as having self-decomposition property, when the self-decomposition property is evaluated by the above method under the temperature condition and the pressure (gauge pressure) condition. The above formula was determined based on these measured values. Further, measured values at the respective evaluation points are shown in Table 6. In Table 6, "before ignition" means a point when a platinum wire disposed in the interior is not fused after each of mixed fluids in various proportions is enclosed to a predetermined pressure, and "after ignition" means a point when an energy of about 30 J is applied by fusing the platinum wire.

TABLE 6

| Pressure [MPaG] | | Temperature [° C.] | | Self-decomposition reaction |
|---|---|---|---|---|
| Before ignition | After ignition | Before ignition | After ignition | |
| 0.98 | 9.00 | 40 | 129.6 | Occurred |
| 0.80 | 5.60 | 100 | 161.5 | Occurred |
| 0.70 | 5.00 | 140 | 192.6 | Occurred |
| 0.60 | 3.90 | 180 | 224.2 | Occurred |
| 0.90 | 0.90 | 40 | 40.2 | Nil |
| 0.80 | 0.80 | 70 | 70.3 | Nil |
| 0.70 | 0.70 | 100 | 100.3 | Nil |
| 0.60 | 0.60 | 140 | 140.4 | Nil |
| 0.50 | 0.50 | 180 | 180.3 | Nil |
| 0.50 | 0.50 | 250 | 250.3 | Nil |

In the production method of the present invention, the first component may, for example, be purified by HFO-1123 having a content of HFO-1123 within a range of from about 70 to about 100 mol % obtained by distilling crude HFO-1123 obtained by e.g. hydrogen reduction of chlorotrifluoroethylene.

The first component may contain a compound other than HFO-1123 in a proportion of less than 30 mol % based on the entire amount of the first component. Such a compound other than HFO-1123 which the first component may contain may, for example, be at least one member selected from by-products formed at the time of producing HFO-1123, and a saturated hydrofluorocarbon, an unsaturated hydrofluorocarbon, an unsaturated hydrochlorofluorocarbon and an unsaturated chlorofluorocarbon which the second component contains.

At the time of setting the condition to secure the stability at the time of storage of the first component thus obtained, in the same manner as above, by setting the condition so that the first component is stable even when it has a HFO-1123 content of 100 mol % and is most likely to undergo self-decomposition, stability at the time of storage is secured even in a case where the content of HFO-1123 in the first component is not 100 mol %.

Thus, the first component will be described below with reference to a case where the content of HFO-1123 is 100 mol %.

Figure 2:
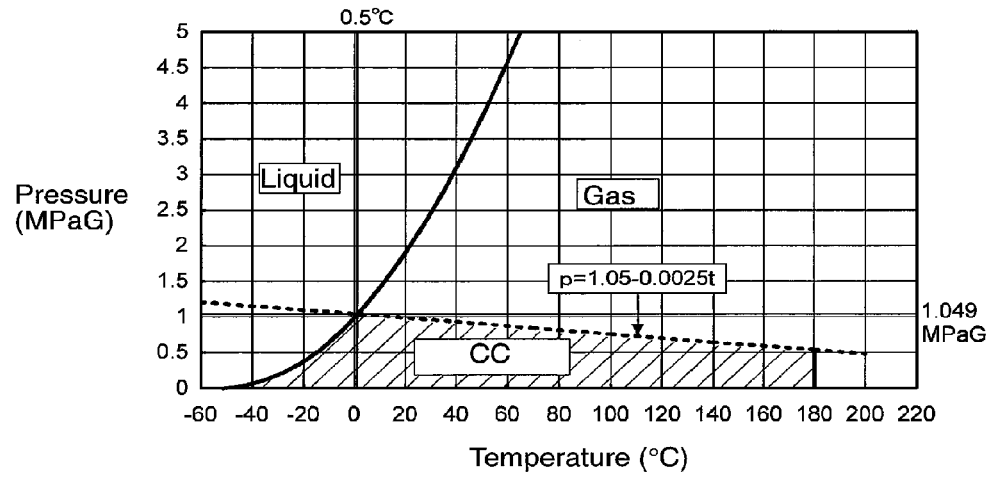
FIG. 2 is a graph illustrating a range suitable for storage of HFO-1123 having a graph illustrating the relation between the temperature and the vapor pressure of HFO-1123 drawn on the graph of FIG. 1.

Stability of HFO-1123 at the time of storage is secured when HFO-1123 is stored in a state where its temperature (t) and pressure (p) satisfy $p[MPaG] < 1.05 - 0.0025t$. If HFO-1123 can be stored in a specific container in such a state that only a liquid of HFO-1123 is present, HFO-1123 can be stably stored without self-decomposition in such a case. In FIG. 2, a graph illustrating the relation between the temperature and the pressure under which HFO-1123 is liquid (vapor pressure curve) is drawn on the graph of FIG. 1. In FIG. 2, the solid curve is the vapor pressure curve, and in a region on the right side of the vapor pressure curve, HFO-1123 is gaseous, and in a region on the left side, HFO-1123 is liquid. The above-described state such that only a liquid of HFO-1123 is present corresponds to the liquid region on the left side of the vapor pressure curve in FIG. 2.

Here, usually, in a case where a liquid of HFO-1123 is stored in a container, it is stored in a gas/liquid mixture state in which the liquid and the gas of HFO-1123 coexist. The temperature and the pressure in the gas/liquid mixture state are represented by the temperature and the pressure on the vapor pressure curve, and it is in a region at a temperature of at most 180° C. and below the self-decomposition boundary that HFO-1123 is in a stable state in the gas/liquid mixture state. Specifically, it is a region on the vapor pressure curve below the intersection point (temperature: 0.5° C., pressure: 1.049 MPaG) with the self-decomposition boundary. Considering these points, the range suitable for storage of HFO-1123 may be a shaded region in FIG. 2, that is, a region surrounded by the straight line of t=180° C., the straight line of p=1.05−0.0025t and the vapor pressure curve except for on the line of p=1.05−0.0025t.

In this specification, "range suitable for storage" of HFO-1123 is a term meaning the above shaded region in FIG. 2. Even in a case where a liquid of HFO-1123 is stored in a container, it may be stably stored under temperature and pressure conditions in the liquid region on the left side of the vapor pressure curve in FIG. 2, so long as the portion not filled with the liquid in the container can be totally replaced with a gas other than HFO-1123, which has no influence over storage of the HFO-1123, for example, nitrogen.

(Second Component)

The second component is a component having no self-decomposition property containing at least one member selected from a saturated hydrofluorocarbon, an unsaturated hydrofluorocarbon, an unsaturated hydrochlorofluorocarbon and an unsaturated chlorofluorocarbon in a proportion of at least 30 mol %.

As at least one member selected from a saturated hydrofluorocarbon, an unsaturated hydrofluorocarbon, an unsaturated hydrochlorofluorocarbon and an unsaturated chlorofluorocarbon which the second component contains, the above-exemplified compounds may be mentioned. Preferred compounds and their combinations are also as mentioned above. The second component may be a mixture having no self-decomposition property containing HFO-1123 in a proportion of less than 70 mol %.

The second component should have a composition with which when mixed with the first component in a predetermined proportion, the above working fluid to be produced by the production method of the present invention, that is, a working fluid containing at least HFO-1123 in a proportion of at most 70 mol %, is obtained. It preferably has a composition with which a working fluid having any one of the above compositions (i) to (iii) is obtained. From such a viewpoint, the second component preferably comprises HFO-1234yf and/or HFC-32.

In the production method of the present invention, the first component and the second component are prepared as stored in a first container and a second container, respectively. And, mixing of the first component and the second component is carried out by any one of the steps (A), (B) and (C). In the following description, the pressure is the gauge pressure unless otherwise specified.

(Step (A))

The step (A) is a step of supplying the first component to the second container in which the second component is stored under the condition (1) or (2).

The following conditions (1) and (2) relate to the temperature (t1) and the pressure (p1) of the first component when the first component is supplied to the second container, and the temperature (T2) and the pressure (P2) in the second container at least during the period from the start of the supply of the first component to the second container until the completion of mixing of the first component and the second component conducted in the second container by the supply.

In this specification, the temperature and the pressure "at the time of the supply" mean the temperature and the pressure at a point when a certain component enters the container, and unless otherwise specified, in a case where the supply is continuously conducted, they are kept constant from the start to the completion of the supply.

Further, all the conditions in the step (A) are set based on the condition under which the first component having a content of HFO-1123 of 100 mol % is stable. Thus, the above conditions in the step (A) can be regarded as conditions under which the stability can be secured in all the cases where a first composition having any composition and a second component having any composition within the specified range are mixed to produce a working fluid having any composition. Such condition setting based on the condition under which the first component having a content of HFO-1123 of 100 mol % is stable is applied to the after-mentioned steps (B) and (C), and accordingly in the steps (B) and (C) also, the stability can be secured in the same manner as in the step (A).

(1) The temperature (t1) of the first component at the time of the supply is kept to be t1<0.5° C., and at least during the period from the start of the supply to the completion of mixing, the relation between the gauge pressure (P2) in the second container and the gauge pressure (p1) of the first component at the time of the supply is kept to be p1>P2, and the temperature (T2) in the second container is kept to be in a state of T2<0.5° C.

(2) The first component at the time of the supply is in a gaseous state with its temperature (t1) of 0.5° C.≤t1≤180° C. and its gauge pressure (p1) of p1[MPa]<1.05−0.0025t1, and at least during the period from the start of the supply to the completion of mixing, the relation between the gauge pressure (P2) in the second container and the gauge pressure (p1) of the first component is kept to be p1>P2, and the temperature (T2) in the second container is kept to be in a state of T2≤180° C. and T2<(1.05−p1)/0.0025.

In the above conditions (1) and (2) in the step (A), the same condition is the condition relating to the pressure such that the relation between the pressure (p1) of the first component and the pressure (P2) in the second container when the first component is supplied to the second container is p1>P2. This pressure condition is an essential condition when the first component is supplied to the second container. The conditions (1) and (2) respectively represent the relation of the temperature (T2) in the second container with the temperature (t1) and the pressure (p1) of the first component at the time of the supply, under the essential pressure condition of p1>P2 when the first component is supplied to the second container.

The second container in the step (A) has a temperature (T2) and a pressure (P2) under the above condition (1) or (2) at least during the period from the start of the supply of the first component to the completion of mixing of the first component and the second component conducted in the second container by the supply.

At the time of the completion of mixing, a working fluid having a stable composition according to an embodiment of the present invention is obtained as a content in the second container. In such a manner, before the start of the supply and after the completion of mixing, both the second component stored in the second container and the working fluid according to an embodiment of the present invention have no self-decomposition property, and are not required to be handled with care from the viewpoint of self-decomposition.

Here, "at the time of the completion of mixing" is usually a point when the supply of the first component is terminated, as described hereinafter.

Here, the temperature (T1) and the pressure (P1) in the first container in which the first component is stored are always kept to be the temperature and the pressure under the above-mentioned condition under which the first component having a content of HFO-1123 of 100 mol % is stable, preferably the temperature and the pressure in a region at 180° C. or lower and below the self-decomposition boundary, more preferably the temperature and the pressure within the range suitable for storage.

Usually, when the first component is supplied to the second container in which the second component is stored, a supply pipe which connects the first container to the second container is provided, and the first component is supplied to the second container via the supply pipe. The supply pipe which connects the first container to the second container usually has a means to control ON/OFF of the supply of the first component and the supply amount per unit time, and as the case requires, has a pressure controlling means and a temperature controlling means. In the step (A), in order to achieve the essential condition p1>P2 in this step, usually a pressure controlling means provided to the supply pipe, typically a pump is employed.

Figure 3:
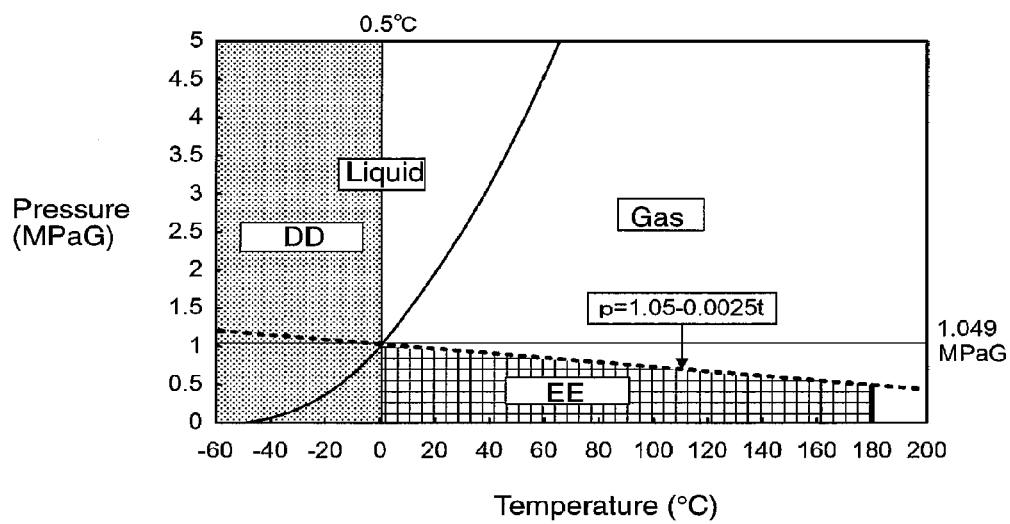
FIG. 3 is a graph having a graph illustrating the relation between the temperature and the vapor pressure of HFO-1123 drawn on the graph of FIG. 1.

As mentioned above, the temperature (t1) and the pressure (p1) of the first component at the time of the supply do not necessarily agree with the temperature and the pressure of the first component stored at the temperature (T1) under the pressure (P1) in the first container. In FIG. 3, the ranges of the temperature (t1) and the pressure (p1) of the first component at the time of the supply under which the first component can be stably supplied to the second container, are shown by the filled region and a grid pattern. That is, when the temperature (t1) and the pressure (p1) of the first component at the time of the supply are within a filled region of t1<0.5° C. (hereinafter sometimes referred to as "low temperature region") or within a region of gas of 0.5° C.≤t1≤180° C. and p1[MPa]<1.05−0.0025t1 (hereinafter sometimes referred to as "low pressure region") represented by a grid pattern in FIG. 3, the first component can be stably supplied under the above pressure condition of p1>P2, by setting the temperature (T2) in the second container to be under the predetermined condition, specifically, under the condition (1) or (2). On that occasion, it is preferred to adjust the amount of the first component supplied to the second container per unit time.

The condition (1) is a condition under which the first component in the low temperature region is supplied to the second container in the same temperature region in a lower pressure state, and when this condition is satisfied, the stability of the second container can be secured. Further, the condition (2) is a condition under which the first component in the low pressure region is supplied to the second container in such a state that the pressure is lower, the temperature (T2) is at most 180° C., and the pressure (p1) is below the self-decomposition boundary even when the temperature (t1) of the first component is increased to the temperature (T2) in the second container, and when such a condition is satisfied, the stability of the second container can be secured.

Further, in a case where the first component is mixed with the second component, in view of efficiency, they are preferably mixed in a state where they are both liquid. In order that such a condition is met, for example, the first component is stored as a liquid at less than 0.5° C. in the first container. As described above, usually, the first component is preferably stored in a state where its gas and its liquid coexist. Accordingly, the first container is preferably adjusted to be in a state such that the temperature and the pressure are on the vapor pressure curve of HFO-1123 at less than 0.5° C.

Further, in order that the first component as a liquid is supplied to the second container, the temperature (t1) and the pressure (p1) of the first component at the time of the supply are adjusted so that p1>P2 is satisfied and the first component is in the low temperature region and in the liquid region. In such a case, the temperature in the second container is adjusted to be in a state of T2<0.5° C. in accordance with the above (1). As mentioned above, the second component is preferably in a liquid state, and a condition under which the second component is liquid is selected within a range of the condition of the second container, that is, the condition of p1>P2 and t2<0.5° C.

Figure 4:
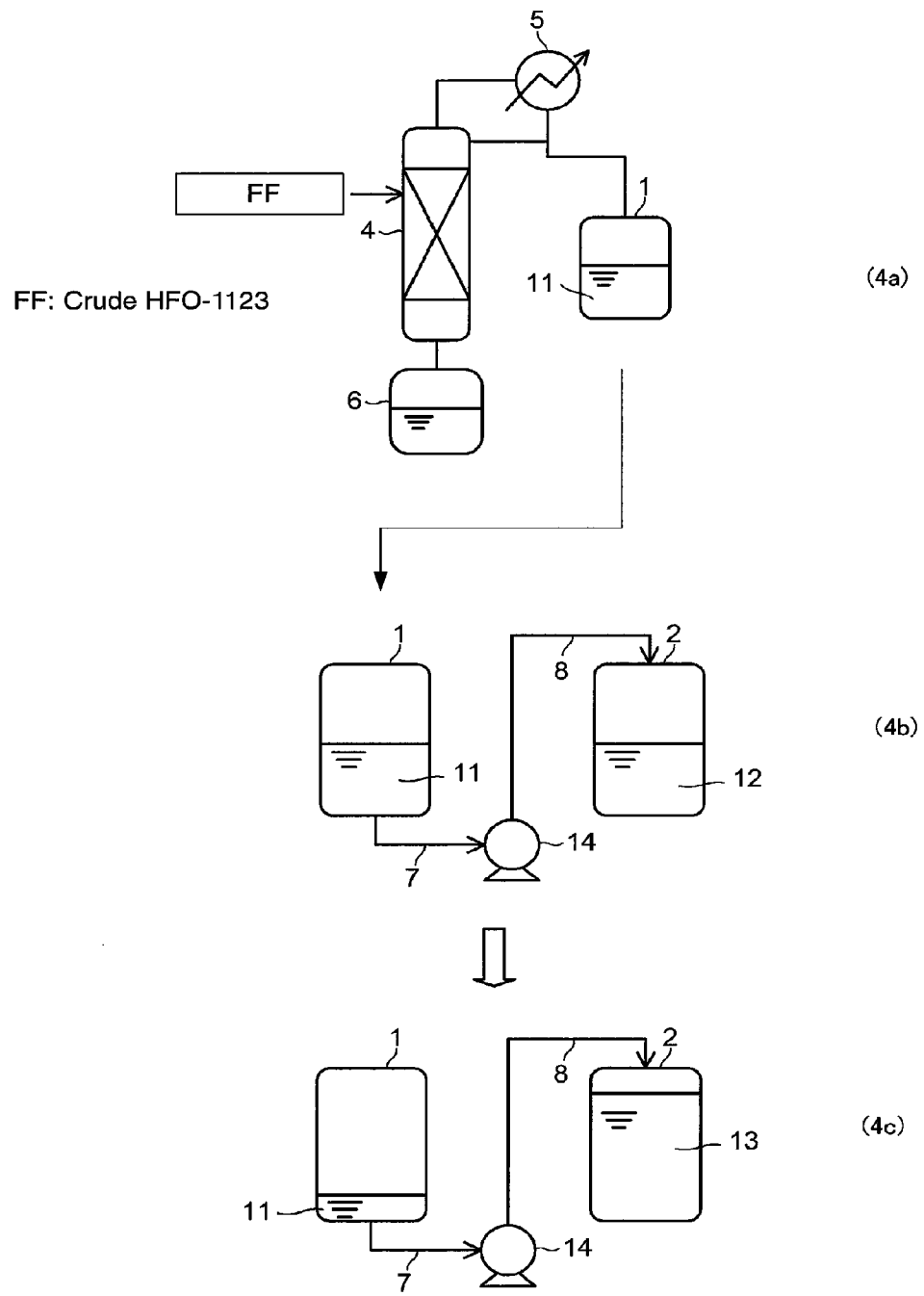
FIG. 4 is a diagram schematically illustrating an example of an operation to supply the first component to the second container in a case where both the first component and the second component are liquids at less than 0.5° C.

FIG. 4 is a view schematically illustrating an example of the step (A) in a case where both the first component and the second component are liquids at less than 0.5° C.

In FIG. 4 (4a), as a first component 11, HFO-1123 (liquid) is prepared in such a manner that crude HFO-1123 obtained by e.g. hydrogen reduction of chlorotrifluoroethylene is supplied to a distiller 4, by-products are removed as a bottoms fraction into a bottoms storage tank 6, and a fraction obtained from a column top is subjected to a cooling/condensing means 5 to obtain a distillate HFO-1123 (liquid). HFO-1123 (liquid) is obtained as stored in a first container 1. The first component may be a commercially available first component in a container.

HFO-1123 (liquid) 11 obtained as stored in the first container 1 is supplied to a separate second container 2 in which a second component (liquid) 12 is stored. FIG. 4 (4b) is a diagram illustrating a state before the first component 11 is supplied to the second container 2, and FIG. 4 (4c) is a diagram illustrating a state where the first component 11 is supplied to the second container and a working fluid 13 is obtained. The second component may be a bottoms fraction or a distillate stored in the second container, produced by a known method and purified by distillation, or may be a commercially available second component in a container, in the same manner as the first component.

For example, the temperature (T1) in the first container 1 is less than 0.5° C. as described above, and the pressure (P1) is adjusted to be a pressure under which the first component is liquid, specifically, a pressure above the vapor pressure curve at a temperature of at least −55° C. and less than 0.5° C. The temperature and the pressure of the first component in the first container are the same as the temperature (T1) and the pressure (P1) in the first container.

The first container 1 has an exhaust port, the second container 2 has a supply port, and they are connected by a supply pipe 7 and a supply pipe 8 through which a gas or a liquid can flow via a pump 14. The first component 11 in the first container 1 moves from the exhaust port of the first container 1 through the supply pipe 7 and the supply pipe 8 via the pump 14 to the supply port of the second container 2 and is supplied to the second container 2. The supply pipe 7 connects the exhaust port of the first container 1 to the pump 14, and the supply pipe 8 connects the pump 14 to the supply port of the second container 2.

Of the second container 2 the temperature (T2) is kept to be less than 0.5° C. and the pressure (P2) is kept to be a pressure under which the second component stored in the second container 2 is in a liquid state.

Here, in a case where the pressure (P2) in the second container 2 is lower than the pressure (P1) in the first container 1, usually, the first component moves by its own pressure. In such a case, the pressure (p1) and the temperature (t1) of the first component at the time of the supply to the second container are the same as the temperature (T1) and the pressure (P1) in the first container. In such a case, the relation of the pressure is P1=p1>P2.

In a case where the pressure (P2) is higher than the pressure (P1), the pressure (p1) of the first component at the time of the supply is elevated by the pump 14 to a pressure higher than the pressure (P2) in the second container. In such a case, the temperature (t1) of the pressurized first component is not necessarily the same as the temperature (T1) before pressurization, however, the first component is pressurized within a range where the temperature (t1) is kept to be less than 0.5° C. That is, the first component is supplied to the second container as a liquid in the low temperature region. In such a case, the temperature and the pressure of the first component in the supply pipe 7 connecting the first container 1 and the pump 14 are the same as the temperature (T1) and the pressure (P1) of the first container. On the other hand, the temperature and the pressure of the first component in the supply pipe 8 connecting the pump 14 and the second container 2 are the same as the temperature (t1) and the pressure (p1) of the first component at the time of the supply, and the pressure satisfies the relation of P1<P2<p1.

In this example, the condition under which the step (A) is carried out corresponds to the above (1). Accordingly, at least during the period from the start of the supply of the first component to the completion of mixing of the first component and the second component, the temperature (T2) in the second container 2 is kept to be less than 0.5° C.

In such a manner, the first component 11 is supplied to the second container 2, and the second component 12 and the first component 11 are mixed in the second container 2. The supply of the first component 11 is terminated at a point when the content in the second container 2 has the desired composition of the working fluid 13. The supply of the first component 11 is terminated preferably at a point when the desired composition of the working fluid 13 is measured by a means of continuously measuring the composition of the content in the second container 2. Otherwise, the amounts of the first component and the second component to be mixed may be preliminarily adjusted in accordance with the desired composition of the working fluid 13.

Figure 5:
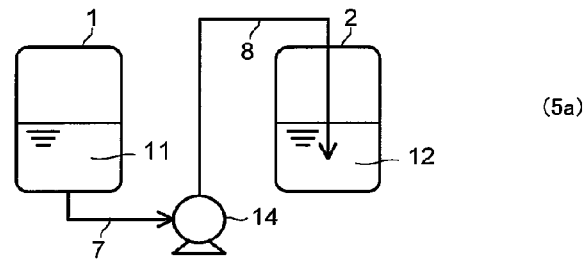
FIG. 5 is a drawing schematically illustrating another example of an operation to supply the first component to the second container in a case where both the first component and the second component are liquids at less than 0.5° C.
Figure 5:
Figure 5:
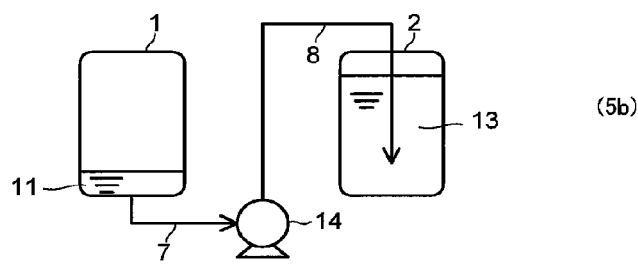

Further, in a case where both the first component and the second component are liquids at less than 0.5° C., the step (A) may be carried out, for example, as shown in FIG. 5. FIG. 5 is a diagram schematically illustrating an operation to supply the first component in a liquid state to the second component in a liquid state stored in the second container, when the step (A) is carried out in a state where both the first component and the second component are liquids at less than 0.5° C.

In the method shown in FIG. 5, one end of a supply pipe 8 is connected to a pump 14, and the other end reaches into a second component (liquid) 12 via a supply port of a second container 2 from the pump 14, whereas in the method shown in FIG. 4, the supply pipe 8 is provided so as to connect the pump 14 and the supply port of the second container 2. There is no other difference. In the method shown in FIG. 5 also, the above-described condition under which the step (A) is carried out in a case where both the first component and the second component are liquids at less than 0.5° C. is the same.

For example, the advantage of supplying the first component in a liquid state to the liquid of the second component stored in the second container as shown in FIG. 5 is that mixing of the second component and the first component is accelerated.

(Step (B))

The step (B) is a step of supplying the second component to the first container in which the first component is stored under the following conditions (3) and (4).

(3) At least during the period from the start of the supply to the completion of mixing, the temperature (T1) and the gauge pressure (P1) in the first container are kept to be in a state of T1<0.5° C. or in a state of 0.5° C.≤T1≤180° C. and P1[MPa]<1.05−0.0025T1.

(4) The gauge pressure (p2) of the second component is p2>P1 at least at the time of the supply.

The condition (4) in the step (B) is a condition relating to the pressure such that the relation between the pressure (p2) of the second component and the pressure (P1) in the first container at the time of supplying the second component to the first container is p2>P1. This pressure condition is an essential condition when the second component is supplied to the first container.

Further, the condition (3) is a condition such that at least during the period from the start of the supply of the second component to the first container until the completion of mixing of the first component and the second component conducted in the first container by the supply, the temperature (T1) and the pressure (P1) in the first container are kept in the low temperature region or in the low pressure region shown in FIG. 3. Here, "the completion of mixing" usually means a point when the supply of the second component is terminated.

The temperature (T1) and the pressure (P1) in the first container in which the first component is stored are kept to be the temperature and the pressure within a range within which the first component having a content of HFO-1123 of 100 mol % is stable, preferably the temperature and the pressure in a region at a temperature of at most 180° C. and below the self-decomposition boundary, more preferably the temperature and the pressure within the range suitable for storage, before the start of the supply of the second component. Further, at the completion of mixing, a working fluid having a stable composition according to an embodiment of the present invention is obtained as a content in the first container. The working fluid has no self-decomposition property, and accordingly after the completion of mixing, the first container is not required to be handled with care from the viewpoint of self-decomposition.

In the step (B), the temperature (T2) and the pressure (P2) in the second container 2 are not particularly limited. The temperature and the pressure of the second component in the second container 2 are the same as the temperature (T2) and the pressure (P2), and the temperature (t2) and the pressure (p2) of the second component when supplied to the first container 1 may be adjusted, for example, by the following means.

Usually, when the second component is supplied to the first container in which the first component is stored, a supply pipe which connects the second container to the first container is provided, and the second component is supplied to the first container via the supply pipe. The supply pipe which connects the first container to the second container usually has a means to control ON/OFF of the supply of the second component and the supply amount per unit time, and as the case requires, has a pressure controlling means and a temperature controlling means. In the step (B), in order to achieve the essential condition p2>P1 in this step, usually a pressure controlling means provided to the supply pipe, typically a pump is employed.

In the step (B), in order to keep the temperature (T1) and the pressure (P1) in the first container to be within the low temperature region or the low pressure region shown in FIG. 3 from the start of the supply of the second component to the completion of mixing, the temperature (t2) and the pressure (p2) and further the supply amount per unit time at the time of the supply of the second component to the first container are adjusted so that the temperature (T1) and the pressure (P1) are within the range. For example, in a case where the temperature (T1) and the pressure (P1) in the first container are in the low temperature region, the temperature (t2) and the pressure (p2) at the time of the supply of the second component are set to be within the low temperature region. Further, in a case where the temperature (T1) and the pressure (P1) in the first container are in the low pressure region, the temperature (t2) and the pressure (p2) at the time of the supply of the second component are set to be within the low temperature region. In such a case, a condition such that the pressure (p2) is within the low pressure region and t2<(1.05−P1)/0.0025 may be mentioned for more stable operation.

In this step (B) also, in the same manner as the case of the step (A), when the efficiency is emphasized, it is preferred to mix the first component and the second component in a state where they are both liquid.

In order that such a condition is met, for example, before the second component is supplied, the first component is stored as a liquid at less than 0.5° C. in the first container. As described above, usually, the first component is preferably stored in a state where its gas and its liquid coexist. Accordingly, before the second component is supplied, the first container is preferably adjusted to be in a state such that the temperature and the pressure are on the vapor pressure curve of HFO-1123 at less than 0.5° C.

Into the first container in such a state, the second component which is in a liquid state at less than 0.5° C. and which satisfies p2>P1 is supplied so that the above conditions (3) and (4) are satisfied, and is mixed with the first component in a liquid state at a temperature of less than 0.5° C. and on the vapor pressure curve of HFO-1123. In the step (B), preferably, as mentioned above, the first component and the second component are mixed in a state where they are both liquid.

Figure 6:
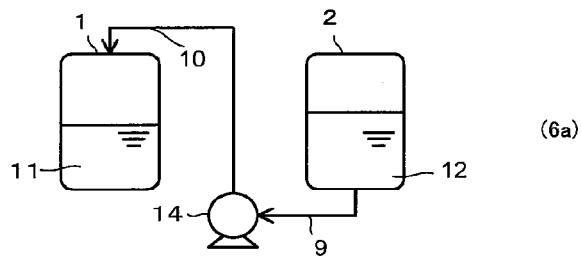
FIG. 6 is a diagram schematically illustrating an example of an operation to supply the second component to the first container in a case where both the first component and the second component are liquids at less than 0.5° C.
Figure 6:
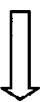
Figure 6:
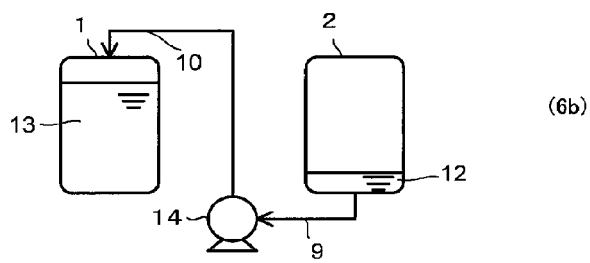

FIG. 6 is a view schematically illustrating an example of the step (B) in a case where the first component and the second component are both liquid at less than 0.5° C.

A first container 1 in which a first component 11 is stored and a second container 2 in which a second component 12 is stored are prepared in the same manner as the above step (A). FIG. 6 illustrates an operation to supply the second component (liquid) 12 stored in the second container 2 to the first container 1 in which the first component (liquid) 11 is stored. FIG. 6 (6a) is a diagram illustrating a state before the second component 12 is supplied to the first container 1, and FIG. 6 (6b) is a diagram illustrating a state where the second component 12 is supplied to the first container 1 and a working fluid 13 is obtained.

In FIG. 6 (6a), for example, the temperature (T1) in the first container 1 is less than 0.5° C. as described above, and the pressure (P1) is adjusted to be a pressure under which the first component is liquid, specifically, a pressure above the vapor pressure curve at a temperature of at least −55° C. and less than 0.5° C. The temperature and the pressure of the first component in the first container are the same as the temperature (T1) and the pressure (P1) in the first container.

The second container 2 has an exhaust port, the first container 1 has a supply port, and they are connected by a supply pipe 9 and a supply pipe 10 through which a gas or a liquid can flow via a pump 14. The second component 12 in the second container 2 moves from the exhaust port of the second container 2 through the supply pipe 9 and the supply pipe 10 via the pump 14 to the supply port of the first container 1 and is supplied to the first container 1. The supply pipe 9 connects the exhaust port of the second container 2 to the pump 14, and the supply pipe 10 connects the pump 14 to the supply port of the first container 1.

Of the second container 2, the temperature (T2) is kept to be less than 0.5° C. and the pressure (P2) is kept to be a pressure under which the second component stored in the second container 2 is in a liquid state.

Here, in a case where the pressure (P1) in the first container 1 is lower than the pressure (P2) in the second container 2, usually, the second component moves by its own pressure. In such a case, the pressure (p2) and the temperature (t2) of the second component at the time of the supply to the first container are the same as the temperature (T2) and the pressure (P2) in the second container. In such a case, the relation of the pressure is P2=p2>P1.

In a case where the pressure (P1) is higher than the pressure (P2), the pressure (p2) of the second component at the time of the supply is elevated by the pump 14 to a pressure higher than the pressure (P1) in the first container. In such a case, the temperature (t2) of the pressurized second component is not necessarily the same as the temperature (T2) before pressurization, however, the second component is pressurized within a range where the temperature (t2) is kept to be less than 0.5° C. That is, the second component is supplied to the first container as a liquid in the low temperature region. In such a case, the temperature and the pressure of the second component in the supply pipe 9 connecting the second container 2 and the pump 14 are the same as the temperature (T2) and the pressure (P2) of the second container. On the other hand, the temperature and the pressure of the second component in the supply pipe 10 connecting the pump 14 and the first container 1 are the same as the temperature (t2) and the pressure (p2) of the second component at the time of the supply, and the pressure satisfies the relation of P2<P1<p2.

In this example, the condition under which the step (B) is carried out corresponds to the above (3) and (4). Accordingly, at least during the period from the start of the supply of the second component to the completion of mixing of the second component and the first component, the temperature (T1) in the first container 1 is kept to be less than 0.5° C.

In such a manner, the second component 12 is supplied to the first container 1, and the second component 12 and the first component 11 are mixed in the first container 1. The supply of the second component 12 is terminated at a point when the content in the first container 1 has the desired composition of the working fluid 13. The supply of the second component 12 is terminated preferably at a point when the desired composition of the working fluid 13 is measured by a means of continuously measuring the composition of the content in the first container 1. Otherwise, the amounts of the first component and the second component to be mixed may be preliminarily adjusted in accordance with the desired composition of the working fluid 13.

Further, in a case where the step (B) is carried out in such a state that both the first component and the second component are liquids at less than 0.5° C., a method of the supply the second component in a liquid state to the first component in a liquid state stored in the first container, may be employed. The advantage of supplying the second component in a liquid state to the liquid of the first component stored in the first container as mentioned above is that mixing of the second component and the first component is accelerated.

(Step (C))

The step (C) is a step in which to a separate third container, while at least during the period from the start of the following supply to the completion of mixing, the temperature (T3) and the gauge pressure (P3) in the third container are kept to be in a state of T3<0.5° C. (low temperature region) or in a state of 0.5° C.≤T3≤180° C. and P3[MPa]<1.05−0.0025T3 (low pressure region), the first component is supplied under the following condition (5) or (6), and the second component is supplied while at least at the time of the supply, its gauge pressure (p2) is kept to be p2>P3.

The following conditions (5) and (6) relate to the temperature (t1) and the pressure (p1) of the first component when the first component is supplied to the third container, and the temperature (T3) and the pressure (P3) in the third container at least during the period from the start of the supply of the first component to the third container until the completion of mixing of the first component and the second component conducted in the third container by the supply.

The conditions are conditions (1) and (2) in the step (A) except that the second container is changed to the third container, and they are the same except that the temperature (T2) and the pressure (P2) in the second container are changed to the temperature (T3) and the pressure (P3) in the third container.

(5) The temperature (t1) of the first component at the time of the supply is kept to be t1<0.5° C., and at least during the period from the start of the supply to the completion of mixing, the relation between the gauge pressure (P3) in the third container and the gauge pressure (p1) of the first component at the time of the supply is kept to be p1>P3, and the temperature (T3) in the third container is kept to be in a state of T3<0.5° C.

(6) The first component at the time of the supply is in a gaseous state with its temperature (t1) of 0.5° C.≤t1≤180° C. and its gauge pressure (p1) of p1[MPa]<1.05-0.0025t1, and at least during the period from the start of the supply to the completion of mixing, the relation between the gauge pressure (P3) in the third container and the gauge pressure (p1) of the first component is kept to be p1>P3, and the temperature (T3) in the third container is kept to be in a state of T3≤180° C. and T3<(1.05−p1)/0.0025.

In the above conditions (5) and (6) in the step (C), the same condition is the condition relating to the pressure such that the relation between the pressure (p1) of the first component and the pressure (P3) in the third container when the first component is supplied to the third container is p1>P3. This pressure condition is an essential condition when the first component is supplied to the third container. The conditions (5) and (6) respectively represent the relation of the temperature (T3) in the third container with the temperature (t1) and the pressure (p1) of the first component at the time of the supply, under the essential pressure condition of p1>P3 when the first component is supplied to the third container.

The third container in the step (C) has a temperature (T3) and a pressure (P3) under the above condition (5) or (6) at least during the period from the start of the supply of the first component and the second component to the completion of mixing of the first component and the second component conducted in the third container by the supply.

At the time of the completion of mixing, a working fluid having a stable composition according to an embodiment of the present invention is obtained as a content in the third container. Before the start of the supply, there is no content in the third container, and the working fluid according to an embodiment of the present invention, contained in the third container after the completion of mixing, has no self-decomposition property. Accordingly, before the start of the supply and after the completion of mixing, the third container is not required to be handled with care from the viewpoint of self-decomposition. Here, "at the time of the completion of mixing" is usually a point when the supply of the first component is terminated, as described above.

Here, the temperature (T1) and the pressure (P1) in the first container in which the first component is stored are always kept to be the temperature and the pressure under the above-mentioned condition under which the first component having a content of HFO-1123 of 100 mol % is stable, preferably the temperature and the pressure in a region at 180° C. or lower and below the self-decomposition boundary, more preferably the temperature and the pressure within the range suitable for storage.

Usually, when the first component is supplied to the third container, a supply pipe which connects the first container to the third container is provided, and the first component is supplied to the third container via the supply pipe. The supply pipe which connects the first container to the third container usually has a means to control ON/OFF of the supply of the first component and the supply amount per unit time, and as the case requires, has a pressure controlling means and a temperature controlling means. In the step (C), in order to achieve the essential condition p1>P3 in this step, usually a pressure controlling means provided to the supply pipe, typically a pump is employed.

As mentioned above, the temperature (t1) and the pressure (p1) of the first component at the time of the supply do not necessarily agree with the temperature and the pressure of the first component stored at the temperature (T1) under the pressure (P1) in the first container. When the temperature (t1) and the pressure (p1) of the first component at the time of the supply to the third container are in the low temperature region or in the low pressure region, the first component can be stably supplied by setting the temperature (T3) in the third container to be a predetermined condition, specifically, the condition (5) or (6), under the pressure condition of p1>P2.

In the step (C), the temperature (T2) and the pressure (P2) in the second container 2 are not particularly limited. The temperature and the pressure of the second component in the third container 2 are the same as the temperature (T2) and the pressure (P2), and the temperature (t2) and the pressure (p2) of the second component when supplied to the third container 3 may be adjusted, for example, by the following means.

Usually, when the second component is supplied to the third container, a supply pipe which connects the second container to the third container is provided, and the second component is supplied to the third container via the supply pipe. The supply pipe which connects the second container to the third container usually has a means to control ON/OFF of the supply of the second component and the supply amount per unit time, and as the case requires, has a pressure controlling means and a temperature controlling means. In the step (C), in order to achieve the essential condition p2>P3 in this step, usually a pressure controlling means provided to the supply pipe, typically a pump is employed.

In the step (C), in order to keep the temperature (T3) and the pressure (P3) in the third container to be within the low temperature region or the low pressure region from the start of the supply of the first component and the second component to the third container until the completion of mixing in the third container, the temperature (t1) and the pressure (p1) at the time of the supply of the first component are under the condition (5) or (6) and in addition, the temperature (t2) an the pressure (p2) and further the supply amount per unit time at the time of the supply of the second component to the third container are adjusted so that the temperature (T3) and the pressure (P3) are within the range. Further, it is preferred to adjust the supply amount per unit time of the first component also.

For example, in a case where the temperature (T3) and the pressure (P3) in the third container are in the low temperature region, the temperature (t2) and the pressure (p2) of the second component at the time of the supply are set to be within the low temperature region. Further, in a case where the temperature (T3) and the pressure (P3) in the third container are in the low pressure region, the temperature (t2) and the pressure (p2) at the time of the supply of the second component are set to be within the low temperature region. In such a case, a condition such that the pressure (p2) is in the low pressure region and $t2<(1.05-P3)/0.0025$ may be mentioned for more stable operation.

Further, in the same manner as above, in a case where the first component and the second component are mixed, in view of efficiency, they are preferably mixed in a state where they are both liquid.

In order that such a condition is met, for example, the first component is stored as a liquid at less than 0.5° C. in the first container. As described above, usually, the first component is preferably stored in a state where its gas and its liquid coexist. Accordingly, the first container is preferably adjusted to be in a state such that the temperature (T1) and the pressure (P1) are on the vapor pressure curve of HFO-1123 at less than 0.5° C. Likewise, the second component is stored as a liquid at less than 0.5° C. in the second container.

The first component and the second component as liquids at less than 0.5° C. thus prepared, are supplied to the third container kept in the low temperature region in a state of a liquid at less than 0.5° C. which satisfies the condition (5) with respect to the first component and in a state of a liquid at less than 0.5° C. which satisfies the relation of p2>P3 with respect to the second component. In the step (C), preferably, as mentioned above, the first component and the second component are mixed in a state where they are both liquid.

Figure 7:
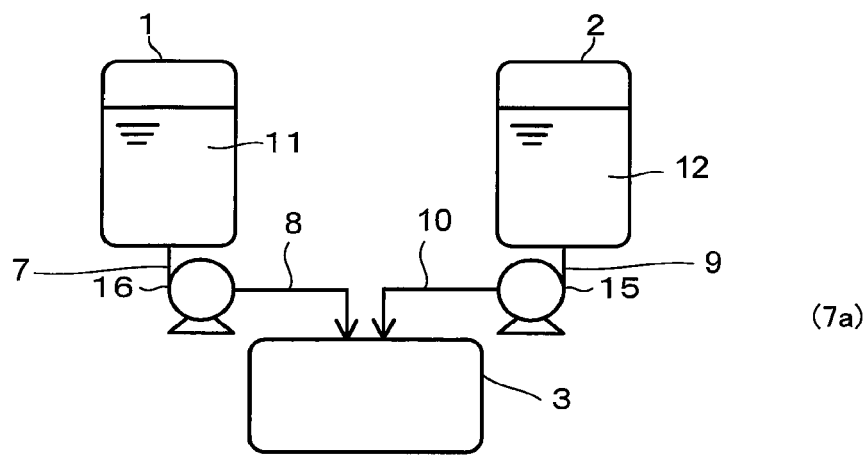
FIG. 7 is a drawing schematically illustrating an example of an operation to supply both the first component and the second component to the third container in a case where both the first component and the second component are liquids at less than 0.5° C.
Figure 7:
Figure 7:
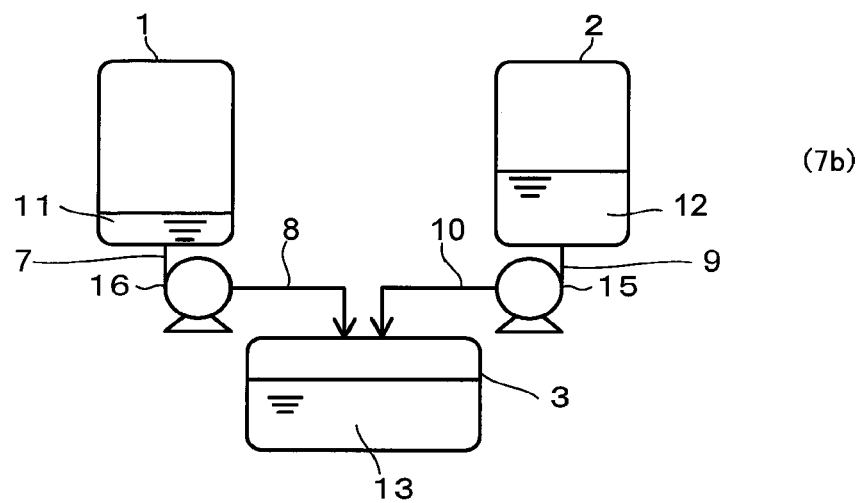

FIG. 7 is a diagram schematically illustrating an example of the step (C) to supply the first component and the second component to the third container in a case where the first component and the second component are both liquids at less than 0.5° C.

FIG. 7 (7a) is a diagram illustrating a state before a first component 11 and a second component 12 are supplied to a third container 3, and FIG. 7 (7b) is a diagram illustrating a state where the first component 11 and the second component 12 are supplied to the third container 3 and a working fluid 13 is obtained. The first container 1 in which the first component 11 is stored and the second container 2 in which the second component 12 is stored shown in FIG. 7 (7a) are prepared in the same manner as the above step (A). FIG. 7 illustrates an operation to supply the first component (liquid) 11 stored in the first container 1 and the second component (liquid) 12 stored in the second container 2 to the third container 3.

Each of the first container 1 and the second container 2 has one exhaust port, and the third container 3 has two supply ports. The exhaust ports of the first container 1 and the second container 2 are respectively connected to the two supply ports of the third container 3 by supply pipes 7 and 8 and by supply pipes 9 and 10 through which a gas or a liquid can flow via pumps 15 and 16. Each of the first component 11 in the first container 1 and the second component 12 in the second container 2 moves from the exhaust port of the first container 1 or the exhaust port of the second container 2 through the supply pipes 7 and 8 or the supply pipes 9 and 10 via the pump 15 or 16 to the supply port of the third container 3 and is supplied to the third container 3.

By supplying both the first component 11 and the second component 12 to the third container 3, the first component 11 and the second component 12 are mixed in the third container 3 to obtain a working fluid 13. The supply of the first component 11 and the supply of the second component 12 are usually carried out simultaneously. In such a case, the supply amount of the first component 11 and the supply amount of the second component 12 to the third container 3 are preferably adjusted so that a content occasionally stored in the third container together with the supplies has the desired composition of the working fluid. Otherwise, a means of continuously measuring the composition of the content in the third container 3 is provided, and the first component 11 and the second component 12 may be supplied while their supply amounts are occasionally adjusted until a required amount of the working fluid having the desired composition is produced.

In this example, the condition under which the step (C) is carried out corresponds to the above (5). Accordingly, at least during the period from the start of the supply of the first component to the completion of mixing the first component and the second component, the temperature (T3) in the third container 3 is kept to be less than 0.5° C.

Further, as the case requires, a predetermined amount of the first component 11 may be supplied to the third container 3 beforehand, and then a predetermined amount of the second component 12 is supplied to the third container 3, or a predetermined amount of the second component 12 may be supplied to the third container 3 beforehand and then a predetermined amount of the first component 11 is supplied to the third container 3. In such a case, in the former case, a desired working fluid can be produced stably by handling the first component and the second component under the same conditions as in the above step (B). Further, in the latter case, a desired working fluid can be produced stably by handling the first component and the second component under the same conditions as in the step (A).

According to the production method of the present invention, when the second component is supplied to the third container in the step (C), from a plurality of second containers, second components which are the same or different, stored in the plurality of second containers, may be supplied. In such a case, the supply of the first component and the supply of the plurality of the second components to the third container may be carried out simultaneously, or as the case requires, any supply may be carried out first, so long as the above-described conditions of the production method of the present invention are satisfied.

In the production method of the present invention, the above-described predetermined component is supplied to the first container, the second container or the third container as mentioned above, whereby the first component and the second component are mixed with a continuously changing composition in the container, and finally a working fluid is obtained. At the time of the supply, for the purpose of preventing the first component and the second component from being present unevenly depending upon the location in the container to which the predetermined component is supplied, it is preferred to supply the predetermined component by using a pump. By supplying the predetermined component while the discharge pressure of the pump is properly adjusted to uniformly mix the first component and the second component in the container, non-uniformity of the concentrations of the components in the container can be prevented.

At the time of the supply of the predetermined component to the first container, the second container or the third container, it is preferred that the tip of the supply pipe is inserted into a liquid phase portion of the component present in the first container, the second container or the third container, whereby non-uniformity of the concentrations of the components depending upon the location in the container can be prevented. Further, in order to prevent non-uniformity of the concentrations of the components depending upon the location in the container in which the first component and the second component are mixed, a means to suppress non-uniformity of the concentrations of the components, such as stirring, may be employed in each container.

The working fluid obtained as described above by the production method of the present invention is a working fluid which is confirmed to have no self-decomposition property under the temperature and pressure conditions under which the working fluid is used. Accordingly, when the working fluid produced in the first container, the second container or the third container is filled in e.g. a container for dispensation, it is not particularly necessary to strictly control the temperature and pressure conditions. For example, in a case where the working fluid is transported from the container in which the working fluid is produced to a container for dispensation, the working fluid is stable even when it is transported under the pressure or at the temperature in a region above the self-decomposition boundary of HFO-1123.

However, preferred conditions at the time of dispensing are such that the working fluid produced in the first container, the second container or the third container is transported to a container for dispensation while keeping the temperature to be from −40° C. to 0.5° C., preferably from −20° C. to 0° C. and keeping the discharge side pressure of a pump to be from 0.1 MPaG to 3.0 MPaG, preferably from 0.3 MPaG to 2.0 MPaG by the gauge pressure, via the pump.

The embodiment of the method for producing a working fluid of the present invention was described above with reference to examples, however, the production method of the present invention is not limited to the above embodiment. Various modifications are possible without departing from the intension and the scope of the present invention, as the case requires.

EXAMPLE

Now, the present invention will be described in further detail with reference to Examples. However, it should be understood that the present invention is not limited to such specific Examples.

Packing Example 1

Example of Supplying HFO-1123 (Liquid) to Container in which Second Component (Liquid) is Stored It is an example of forming 30 kg of a mixed refrigerant comprising HFO-1123/HFC-32=70/30 mol % in a second container.

In a first container, 18 kg of HFO-1123 cooled to 0° C. is packed. On that occasion, the pressure in the first container is 1.0 MPaG. In a second container, 12 kg of HFC-32 cooled to −30° C. is packed. On that occasion, the pressure in the second container is 0.18 MPaG. 18 kg of HFO-1123 cooled to 0° C. is supplied from the first container to the second container. On that occasion, of a supply tube, the temperature is 0° C. and the pressure is 1.0 MPaG. At the time of the supply, HFO-1123 in the first container and the composition in the second container are always in a state where they do not undergo self-decomposition reaction.

The composition comprising HFO-1123/HFC-32=70/30 mol % formed in the second container by such an operation is a composition confirmed to have no self-decomposition property under the temperature and pressure conditions under which it is used as a working fluid. Further, the composition formed in the second container is subjected to liquid compression to 0° C. and 1.5 MPaG by a liquid sending pump and packed in a container for dispensation for product delivery.

Packing Example 2

Example of Supplying Second Component (Liquid) to Container in which HFO-1123 (Liquid) is Stored It is an example of forming 30 kg of a mixed refrigerant comprising HFO-1123/HFC-32=70/30 mol % in a first container.

In a first container, 18 kg of HFO-1123 cooled to −30° C. is packed. On that occasion, the pressure in the first container is 0.18 MPaG. In a second container, 12 kg of HFC-32 cooled to 0° C. is packed. On that occasion, the pressure in the second container is 0.81 MPaG. 12 kg of HFC-32 cooled to 0° C. is supplied from the second container to the first container. On that occasion, of a supply pipe, the temperature is 0° C. and the pressure is 0.81 MPaG. At the time of the supply, the composition in the first container is always in a state where it does not undergo self-decomposition reaction.

Packing Example 3

Example of Supplying HFO-1123 (Liquid) and Second Component (Liquid) to Third Container An example of forming 30 kg of a mixed refrigerant comprising HFO-1123/HFC-32=70/30 mol % in a third container will be described.

In a second container, 12 kg of HFC-32 cooled to −30° C. is packed. On that occasion, the pressure in the second container is 0.18 MPaG. In a separate first container, 18 kg of HFO-1123 cooled to 0° C. is packed. On that occasion, the pressure in the first container is 1.0 MPaG. 12 kg of HFC-32 cooled to −30° C. is supplied from the second container to a third container through a supply pipe at a temperature of −30° C. under a pressure of 0.18 MPaG, and then 18 kg of HFO-1123 cooled to 0° C. is supplied from the first container to the third container through a supply pipe at a temperature of 0° C. under a pressure of 1.0 MPaG. At the time of the supply, HFO-1123 in the first container and the composition in the third container are always in a state where they do not undergo self-decomposition reaction.

INDUSTRIAL APPLICABILITY

The working fluid obtained by the method for producing a working fluid of the present invention can be handled with high stability, and is useful as a refrigerant for a refrigerator (such as a built-in showcase, a separate showcase, an industrial fridge freezer, a vending machine or an ice making machine), a refrigerant for an air-conditioning apparatus (such as a room air-conditioner, a store package air-conditioner, a building package air-conditioner, a plant package air-conditioner, a gas engine heat pump, a train air-conditioning system or an automobile air-conditioning system), a working fluid for power generation system (such as exhaust heat recovery power generation), a working fluid for a heat transport apparatus (such as a heat pipe) or a secondary cooling fluid.

This application is a continuation of PCT Application No. PCT/JP2015/052536 filed on Jan. 29, 2015, which is based upon and claims the benefit of priority from Japanese Patent Application No. 2014-017967 filed on Jan. 31, 2014 and Japanese Patent Application No. 2014-55603 filed on Mar. 18, 2014. The contents of those applications are incorporated herein by reference in their entireties.

REFERENCE SYMBOLS

1: first container, 2: second container, 3: third container, 7, 8, 9, 10: supply pipe, 11: first component, 12: second component, 13: working fluid, 14, 15, 16: pump

What is claimed is:
1. A method for producing a working fluid containing trifluoroethylene in a proportion of at most 70 mol % based on the entire amount, which comprises mixing a first component containing trifluoroethylene in a proportion of higher than 70 mol % stored in a first container, and a second component having no self-decomposition property containing at least one member selected from a saturated hydrofluorocarbon, an unsaturated hydrofluorocarbon, an unsaturated hydrochlorofluorocarbon and an unsaturated chlorofluorocarbon in a proportion of at least 30 mol %, stored in a second container, by the following step (A), (B) or (C):
 (A) the first component is supplied to the second container under the following condition (1) or (2):
  (1) the temperature ($t_1$) of the first component at the time of the supply is $t_1 < 0.5°$ C., and at least during the period from the start of the supply to the completion of mixing, the relation between the gauge pressure ($P_2$) in the second container and the gauge pressure ($p_1$) of the first component at the time of the supply is kept to be $p_1 > P_2$, and the temperature ($T_2$) in the second container is kept to be in a state of $T_2 < 0.5°$ C.;
  (2) the first component at the time of the supply is in a gaseous state with its temperature ($t_1$) of $0.5°$ C. $\leq t_1 \leq 180°$ C. and its gauge pressure ($p_1$) of $p_1[\text{MPa}] < 1.05 - 0.0025 t_1$, and at least during the period from the start of the supply to the completion of mixing, the relation between the gauge pressure ($P_2$) in the second container and the gauge pressure ($p_1$) of the first component is kept to be $p_1 > P_2$, and the temperature

(T2) in the second container is kept to be in a state of T2≤180° C. and T2<(1.05−p1)/0.0025;

(B) the second component is supplied to the first container under the following conditions (3) and (4):

(3) at least during the period from the start of the supply to the completion of mixing, the temperature (T1) and the gauge pressure (P1) in the first container are kept to be in a state of T1<0.5° C. or in a state of 0.5° C.≤T1≤180° C. and P1[MPa]<1.05−0.0025T1, (4) the gauge pressure (p2) of the second component is p2>P1 at least at the time of the supply:

(C) to a separate third container, while at least during the period from the start of the following supply to the completion of mixing, the temperature (T3) and the gauge pressure (P3) in the third container are kept to be in a state of T3<0.5° C. or in a state of 0.5° C.≤T3≤180° C. and P3[MPa]<1.05−0.0025T3, the first component is supplied under the following condition (5) or (6), and the second component is supplied while at least at the time of the supply, its gauge pressure (p2) is kept to be p2>P3:

(5) the temperature (t1) of the first component at the time of the supply is t1<0.5° C., and at least during the period from the start of the supply to the completion of mixing, the relation between the gauge pressure (P3) in the third container and the gauge pressure (p1) of the first component at the time of the supply is kept to be p1>P3, and the temperature (T3) in the third container is kept to be in a state of T3<0.5° C.;

(6) the first component at the time of the supply is in a gaseous state with its temperature (t1) of 0.5° C.≤ T1≤180° C. and its gauge pressure (p1) of p1[MPa]< 1.05−0.0025t1, and at least during the period from the start of the supply to the completion of mixing, the relation between the gauge pressure (P3) in the third container and the gauge pressure (p1) of the first component is kept to be p1>P3, and the temperature (T3) in the third container is kept to be in a state of T3≤180° C. and T3<(1.05−p1)/0.0025.

2. The method for producing a working fluid according to claim 1, wherein in the step (A), both the temperature in the first container and the temperature in the second container are kept to be less than 0.5° C., and the first component in a liquid state with t1<0.5° C. is supplied to the second container.

3. The method for producing a working fluid according to claim 1, wherein in the step (B), both the temperature in the first container and the temperature in the second container are kept to be less than 0.5° C., and the second component in a liquid state with t2<0.5° C. is supplied to the first container.

4. The method for producing a working fluid according to claim 1, wherein in the step (C), all of the temperature in the first container, the temperature in the second container and the temperature in the third container are kept to be less than 0.5° C., and the first component in a liquid state with t1<0.5° C. and the second component in a liquid state with t2<0.5° C. are respectively supplied to the third container.

5. The method for producing a working fluid according to claim 1, wherein the second component is 2,3,3,3-tetrafluoropropene and/or difluoromethane.

6. The method for producing a working fluid according to claim 1, wherein the working fluid obtained by mixing the first component and the second component is a working fluid containing trifluoroethylene and 2,3,3,3-tetrafluoropropene, the proportion of the total amount of trifluoroethylene and 2,3,3,3-tetrafluoropropene based on the entire amount of the working fluid is from 70 to 100 mass %, and based on the total amount of trifluoroethylene and 2,3,3,3-tetrafluoropropene, the proportion of trifluoroethylene is at least 35 mass % and at most 70 mass %.

7. The method for producing a working fluid according to claim 6, wherein the first component is trifluoroethylene.

8. The method for producing a working fluid according to claim 1, wherein the working fluid obtained by mixing the first component and the second component is a working fluid containing trifluoroethylene and difluoromethane, the proportion of the total amount of trifluoroethylene and difluoromethane based on the entire amount of the working fluid is from 70 to 100 mass %, and based on the total amount of trifluoroethylene and difluoromethane, the proportion of trifluoroethylene is at least 35 mass % and at most 70 mass %.

9. The method for producing a working fluid according to claim 1, wherein the working fluid obtained by mixing the first component and the second component is a working fluid containing trifluoroethylene, 2,3,3,3-tetrafluoropropene and difluoromethane, the proportion of the total amount of trifluoroethylene, 2,3,3,3-tetrafluoropropene and difluoromethane based on the entire amount of the working fluid is from 70 to 100 mass %, and based on the total amount of trifluoroethylene, 2,3,3,3-tetrafluoropropene and difluoromethane, the proportion of trifluoroethylene is at least 10 mass % and at most 70 mass %, the proportion of 2,3,3,3-tetrafluoropropene is at most 50 mass %, and the proportion of difluoromethane is at most 75 mass %.

10. The method for producing a working fluid according to claim 9, wherein the second component is a mixture of 2,3,3,3-tetrafluoropropene and difluoromethane.

11. The method for producing a working fluid according to claim 1, wherein the second component is trans-1,3,3,3-tetrafluoropropene.

12. The method for producing a working fluid according to claim 1, wherein the second component is a mixture of trans-1,3,3,3-tetrafluoropropene and difluoromethane.

* * * * *